US010213049B2

(12) United States Patent
Skrodzki et al.

(10) Patent No.: US 10,213,049 B2
(45) Date of Patent: Feb. 26, 2019

(54) ROTISSERIE ADAPTER APPARATUS FOR USE WITH A COOKING DEVICE (71) Applicant: Kamado Concepts, LLC, Indian Orchard, MA (US)

(72) Inventors: Joseph Frank Skrodzki, Indian Orchard, MA (US); Gary F. Bertassi, Palmer, MA (US)

(73) Assignee: KAMADO CONCEPTS, LLC, Indian Orchard, MN (US)

( * ) Notice: Subject to any disclaimer, the term of this patent is extended or adjusted under 35 U.S.C. 154(b) by 106 days.

(21) Appl. No.: 14/894,651

(22) PCT Filed: Jun. 2, 2014

(86) PCT No.: PCT/US2014/040459
§ 371 (c)(1),
(2) Date: Nov. 30, 2015

(87) PCT Pub. No.: WO2014/194311
PCT Pub. Date: Dec. 4, 2014

(65) Prior Publication Data
US 2016/0113441 A1 Apr. 28, 2016

Related U.S. Application Data (60) Provisional application No. 61/832,180, filed on Jun. 7, 2013, provisional application No. 61/829,436, filed on May 31, 2013.

(51) Int. Cl.
A47J 37/04 (2006.01)
A23L 5/10 (2016.01)

(52) U.S. Cl.
CPC .................. A47J 37/04 (2013.01); A23L 5/15 (2016.08); A23V 2002/00 (2013.01)

(58) Field of Classification Search
CPC .............. A23L 5/15; A47J 37/04; A47J 37/06
(Continued)

(56) References Cited

U.S. PATENT DOCUMENTS 2,441,190 A 5/1948 Fuller
3,276,440 A 10/1966 Sazegar
(Continued)

FOREIGN PATENT DOCUMENTS

WO WO2014001115 A1 1/2014

OTHER PUBLICATIONS

Charbroil photo 1, 1 sheet (photo taken Mar. 14, 2014).
(Continued)

Primary Examiner — Ibrahime A Abraham
Assistant Examiner — Spencer H Kirkwood
(74) Attorney, Agent, or Firm — Hayes Soloway PC (57) ABSTRACT A rotisserie adapter apparatus for use with a cooking device includes an annular cylindrical base. The base has an inner wall about a central opening, the inner wall having a substantially consistent depth about the base. The base also includes a top surface abutting the inner wall and an outer wall abutting the top surface, the outer wall having a depth ranging from a first depth at a front of the base comparable to the depth of the inner wall to a near zero depth at a back of the annular cylindrical base. A bottom surface of the base connects between a bottom of the outer wall and an outer surface of the inner wall. At least two notches are formed in the inner wall, wherein the central opening is positioned between notches, and wherein at least one of the notches extends through the top surface of the cylindrical base.

8 Claims, 6 Drawing Sheets (58) Field of Classification Search
USPC .......... 99/421 R, 419, 421 A; 426/523; 126/25 R, 9 R, 25 B, 80, 21 R, 293, 84
See application file for complete search history.

(56) References Cited

U.S. PATENT DOCUMENTS

| | | | |
|---|---|---|---|
| 3,447,445 A | 6/1969 | Koziol | |
| 3,809,058 A | 5/1974 | Becker | |
| 4,037,580 A | 7/1977 | Angelo | |
| 4,300,444 A * | 11/1981 | Muse | A47J 37/0704 99/352 |
| 4,512,249 A | 4/1985 | Mentzel | |
| 5,558,008 A * | 9/1996 | Jenkins | A47J 37/0786 126/25 R |
| 6,439,109 B1 | 8/2002 | Rehill | |
| 6,463,923 B2 | 10/2002 | Carley et al. | |
| 7,219,663 B2 | 5/2007 | Cuomo | |
| 7,644,711 B2 | 1/2010 | Creel | |
| D615,807 S | 5/2010 | Creel | |
| D615,814 S | 5/2010 | Creel | |
| 2002/0017516 A1 | 2/2002 | McKeen et al. | |
| 2003/0140798 A1 * | 7/2003 | Rummel | A47J 37/0713 99/419 |
| 2009/0308373 A1 | 12/2009 | Scott et al. | |
| 2010/0095946 A1 | 4/2010 | Creel | |
| 2010/0258105 A1 | 10/2010 | Simms, II | |
| 2010/0258106 A1 | 10/2010 | Simms, II | |
| 2011/0214662 A1 | 9/2011 | Contarino, Jr. | |
| 2011/0283990 A1 | 11/2011 | Walters et al. | |
| 2013/0319258 A1 * | 12/2013 | Cleveland | A47J 37/04 99/421 R |
| 2014/0021314 A1 | 1/2014 | Bourlier | |

OTHER PUBLICATIONS

Charbroil photo 2, 1 sheet (photo taken Mar. 14, 2014).
Charbroil photo 3, 1 sheet (photo taken Mar. 14, 2014).
Charbroil photo 4, 1 sheet (photo taken Mar. 14, 2014).
"EGG-Tisserie" (2004).

* cited by examiner

FIG. 1

Section A

ROTISSERIE ADAPTER APPARATUS FOR USE WITH A COOKING DEVICE

FIELD OF THE DISCLOSURE

The present disclosure is generally related to cooking apparatuses and more particularly is related to a rotisserie adapter apparatus for use with a cooking device.

BACKGROUND OF THE DISCLOSURE

Rotisserie cooking is a style of roasting where meat is skewered on a spit—a long solid rod used to hold food—while it is being cooked over a fire in a fireplace or over a campfire, or an enclosed cooking device, such as a grill or smoker. One popular use of rotisserie cooking is with cylindrical or egg-shaped grilles and smokers, such as those known within the industry as Kamado grills, which utilize a dome-shaped cover over a cylindrical base. However, problems arise when a rotisserie spit is placed between the cover and the base, because the rotisserie spit prevents the cover from fully closing on the base, thereby allowing heat and smoke to escape from the grill. This loss in insulation quality of the grill decreases cooking temperatures, increases cooking time, and may result in an undesirable cooking system. Similarly, these rounded grills fail to provide other accoutrements for fine grilling, including baskets and diffusers.

Thus, a heretofore unaddressed need exists in the industry to address the aforementioned deficiencies and inadequacies.

SUMMARY OF THE DISCLOSURE

Embodiments of the present disclosure provide a rotisserie adapter apparatus for use with a cooking device. Briefly described, in architecture, one embodiment of the apparatus, among others, can be implemented as follows. A rotisserie adapter apparatus for use with a cooking device includes an annular cylindrical base. The annular cylindrical base has an inner wall about a central opening, the inner wall having a substantially consistent depth about the annular cylindrical base. The annular cylindrical base also includes a top surface abutting the inner wall and an outer wall abutting the top surface, the outer wall having a depth ranging from a first depth at a front of the annular cylindrical base comparable to the depth of the inner wall to a near zero depth at a back of the annular cylindrical base. A bottom surface of the base connects between a bottom of the outer wall and an outer surface of the inner wall, wherein a plane of the top surface and a plane of the bottom surface are converging. At least two notches are formed in the inner wall, wherein the central opening is positioned between the at least two notches, and wherein at least one of the two notches extends through the top surface of the cylindrical base.

The present disclosure can also be viewed as providing a method of cooking within a rounded grill. In this regard, one embodiment of such a method, among others, can be broadly summarized by the following steps: inserting a rod into a food element; inserting the rod within at least two notches formed in an inner wall of an annular cylindrical base, the annular cylindrical base comprising: the inner wall about a central opening, the inner wall having a substantially consistent depth about the annular cylindrical base and protruding into the rounded grill; a top surface abutting the inner wall; an outer wall abutting the top surface, the outer wall having a depth ranging from a first depth at a front of the annular cylindrical base comparable to the depth of the inner wall to a near zero depth at a back of the annular cylindrical base; and a bottom surface connected between a bottom of the outer wall and an outer surface of the inner wall, wherein a plane of the top surface and a plane of the bottom surface are converging; and wherein the central opening is positioned between the at least two notches, wherein at least one of the two notches extends through the top surface of the cylindrical base, and wherein the rod engages with the annular cylindrical base within the notches.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
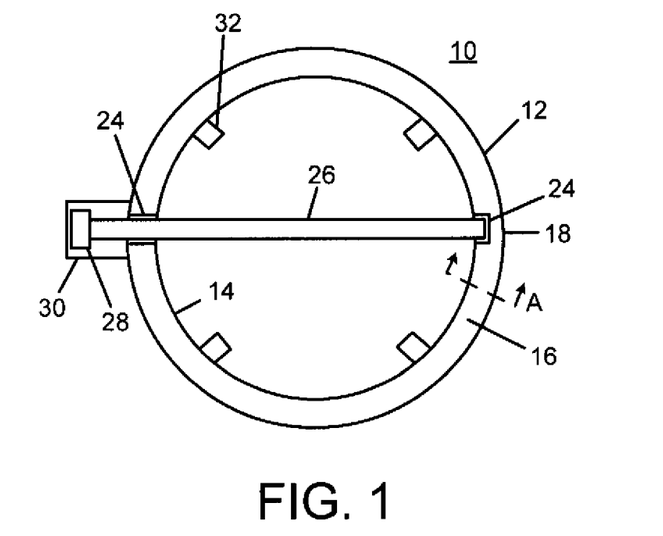
FIG. 1 is a top view illustration of a rotisserie adapter apparatus, in accordance with a first exemplary embodiment of the present disclosure.
Figure 2:
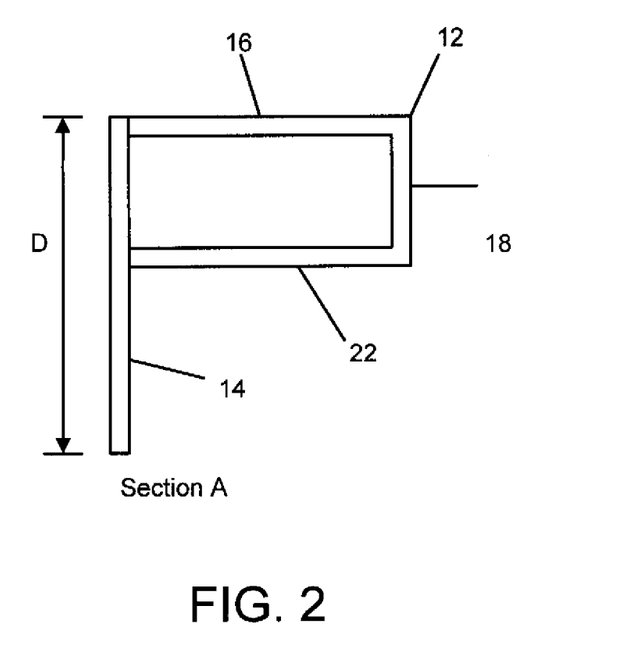
FIG. 2 is a sectional view illustration of the rotisserie adapter apparatus of FIG. 1, in accordance with the first exemplary embodiment of the present disclosure.
Figure 3:
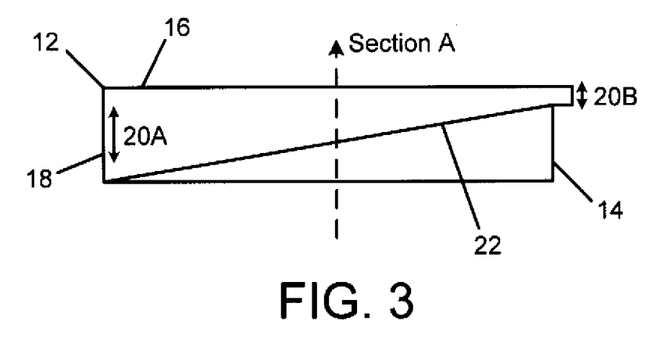
FIG. 3 is a side view illustration of the rotisserie adapter apparatus of FIG. 1, in accordance with the first exemplary embodiment of the present disclosure.

FIG. 1 is a top view illustration of a rotisserie adapter apparatus 10, in accordance with a first exemplary embodiment of the present disclosure. FIG. 2 is a sectional view illustration of the rotisserie adapter apparatus 10 of FIG. 1, in accordance with the first exemplary embodiment of the present disclosure. FIG. 3 is a side view illustration of the rotisserie adapter apparatus 10 of FIG. 1, in accordance with the first exemplary embodiment of the present disclosure. A rotisserie adapter apparatus for use with a cooking device includes an annular cylindrical base 12. The annular cylindrical base 12 has an inner wall 14 about a central opening, the inner wall 14 having a substantially consistent depth D about the annular cylindrical base 12. The annular cylindrical base 12 also includes a top surface 16 abutting the inner wall and an outer wall 18 abutting the top surface 16, the outer wall 18 having a depth ranging from a first depth 20A at a front of the annular cylindrical base comparable to the depth of the inner wall 12 to a near zero depth 20B at a back of the annular cylindrical base 12. A bottom surface 22 of the base 12 connects between a bottom of the outer wall 18 and an outer surface of the inner wall 14, wherein a plane of the top surface 16 and a plane of the bottom surface 22 are converging. At least two notches 24 are formed in the inner wall 14, wherein the central opening is positioned between the at least two notches 24, and wherein at least one of the two notches 24 extends through the top surface 16 of the cylindrical base 12. A plurality of protrusions 32 extend inwardly from the inner wall 14. The double wall 14, 18 design along with the air between the walls 14, 18, traps heat within the cooking device.

The apparatus 10 may be used with cooking devices, namely outdoor grills and smokers with cylindrical designs. For example, the apparatus 10 may be used with cylindrical or egg-shaped grills and smokers, known in the art as Kamado grills, which use a cylindrical opening in the grill and a dome-shaped cover. The cylindrical base 12 may be formed from metal or other hardened, heat-resistant materials, and it may be sized to correspond to conventionally available cooking devices. The top and bottom surfaces 16, 22 of the cylindrical base 12 may be substantially planar, flat surfaces with the central opening formed within an interior wall 14 of the cylindrical base 12 and connecting the top and bottom surfaces 16, 22. The planes of the top and bottom surfaces 16, 22 are not oriented parallel to one another, such that the overall shape of the cylindrical base is angled or wedge-shaped.

The at least two notches 24 are formed in the cylindrical based 12 on opposing sides of the cylindrical base 12. The central opening is positioned between the at least two notches 24. The at least two notches 24 may be used to support and retain a rotisserie cooking system that can suspend and rotate a food product, such as a piece of meat, within the central opening. At least one of the two notches 24 may be open to the top surface 16 of the cylindrical base 12 to allow the rotisserie cooking system to be lowered into the notch 24. Another of the at least two notches 24 may or may not be open to the top surface 16.

The angled or wedge-shaped design of the cylindrical base 12 may be important in ensuring that the apparatus 10 can be used efficiently with the cooking device. Commonly, the thinnest point of the cylindrical base 12 is proximate to the hinge of the cooking device that connects the cover with the base. The thickest part of the cylindrical base 12 is then positioned furthers away from the hinge. When the cover is closed, the rim of the cover may contact the top surface 16 and come to an angular stopping point, as compared to the non-angled stopping point that the cover would have when it is closed on the base when the apparatus 10 is not employed. The angled design of the bottom surface 22 relative to the top surface 16 ensures that there is a proper connection between the cover and the base of the cooking device, using the apparatus 10, such that leakages of heat and smoke are substantially prevented.

Figure 4:
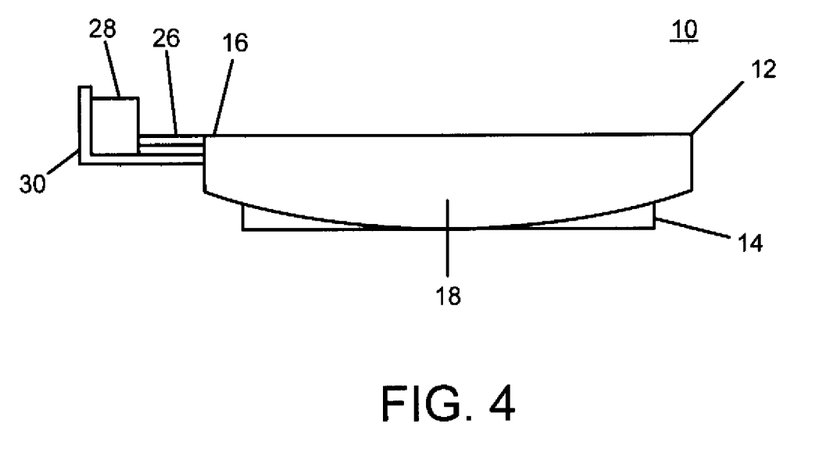
FIG. 4 is a front view illustration of the rotisserie adapter apparatus of FIG. 1, in accordance with the first exemplary embodiment of the present disclosure.
Figure 5:
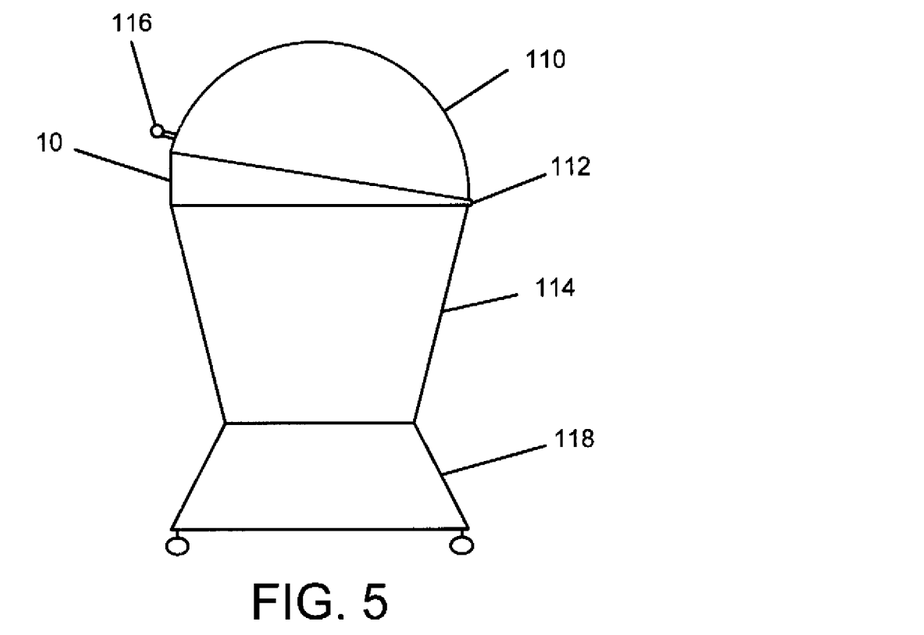
FIG. 5 is a side view illustration of the rotisserie adapter apparatus of FIG. 1 mounted within a grill, in accordance with the first exemplary embodiment of the present disclosure.

FIG. 4 is a front view illustration of the rotisserie adapter apparatus 10 of FIG. 1, in accordance with the first exemplary embodiment of the present disclosure. As can be seen in FIG. 5, a rotisserie attachment structure may be positioned on one or more sides of the cylindrical base 12 to allow for a rotisserie cooking system to be affixed to the apparatus 10. The rotisserie attachment structure may include a spit or rod 26, a motor 28 attached to the rod 26, and a support 30 fixed to the cylindrical base 12 to support the motor 28. The support 30 and motor 28 may be designed with a mechanical engagement mechanism to prevent the motor 28 from moving while in use. The motor 28 may be used to rotate the rod 26 in a manner common to rotisserie cooking. The motor 28 may have an internal power supply or may connect to an electrical outlet. The rod 26 may be fixed with other elements, as is common with rotisserie cooking, such as forks and other elements that help fix the food element to the rod and provide for enhanced cooking. In this regard, the rod 26 may have a non-circular cross-section to engage attachment elements more effectively.

FIG. 5 is a side view illustration of the rotisserie adapter apparatus 10 of FIG. 1 mounted within a grill, in accordance with the first exemplary embodiment of the present disclosure. The apparatus 10 may be very conveniently used with cylindrical or egg-shaped Kamado grills and smokers. In use, the apparatus 10 may be positioned between the cover 110 and the base 114 of the grill. The rotisserie adapter apparatus 10 may have a variety of sizes to correspond to the size of the cooking device that the apparatus 10 is designed to be used with. The rotisserie adapter apparatus 10 may be positioned along the rim of the base 114 of the cooking device, such that the base 114 of the cooking device contacts the bottom surface 22 (not shown). When the cover 12 of the cooking device is closed, the rim of the cover 110 may contact the top surface 14 (not shown) of the rotisserie adapter apparatus 10. The cooking device includes a hinge 112 between the cover 110 and the base of the cooking device 114 and the shallowest portion of the outer wall 118 (not called out) is located proximate to the hinge 112. The cooking device also includes a handle 116 on the cover 110 and legs and wheels 118 for support. The rotisserie adapter apparatus 10 is maintained within the base 114 of the cooking device by the inner wall 14 (not shown) that extends down into the base 114 of the cooking device around most of the circumference of the opening such that the rotisserie adapter apparatus 10 is not prone to sliding out or off of the base 114 of the cooking device.

Figure 6:
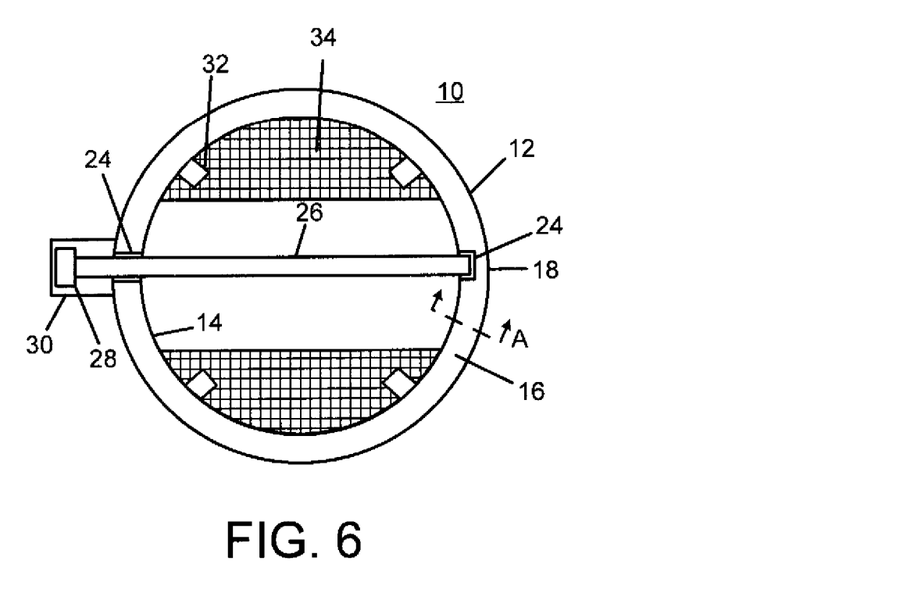
FIG. 6 is a top view illustration of the rotisserie adapter apparatus of FIG. 1, in accordance with the first exemplary embodiment of the present disclosure.

FIG. 6 is a top view illustration of the rotisserie adapter apparatus 10 of FIG. 1, in accordance with the first exemplary embodiment of the present disclosure. FIG. 6 differs from FIG. 1 in that FIG. 6 illustrates a pair of baskets 34 mounted to the protrusions 32 extending inwardly from the inner wall. The baskets 34 may be used to hold additional food elements, such as vegetables, that may not be easily adaptable to the rod 26. The baskets 34 may also be used to hold charcoal, which may provide an additional heat source for cooking the food element on the rod 26. The baskets 34 may include an arcuate wall with openings formed therein to receive the protrusions 32. The openings in the arcuate wall of the baskets 34 may interlock with the protrusions using any known engagement means known to those having ordinary skill in the art.

Figure 7:
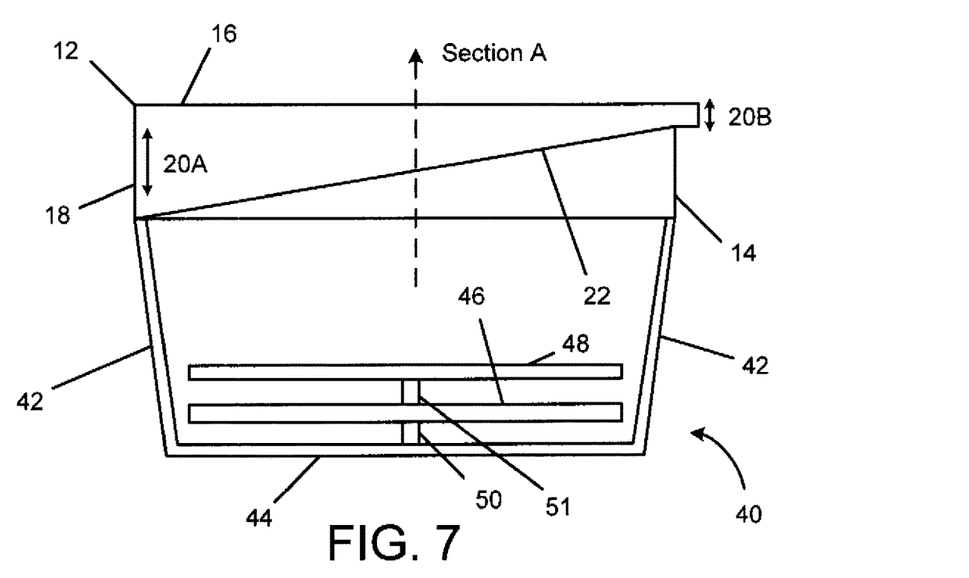
FIG. 7 is a side view illustration of the rotisserie adapter apparatus of FIG. 1, in accordance with the first exemplary embodiment of the present disclosure.

FIG. 7 is a side view illustration of the rotisserie adapter apparatus 10 of FIG. 1, in accordance with a first exemplary embodiment of the present disclosure. FIG. 7 illustrates the rotisserie adapter apparatus 10 with an additional device supported from the protrusions 32 (not shown). Specifically, a diffuser system 40 is provided. The diffuser plate is supported from the protrusions 32 (not shown) by a plurality of brackets 42 angled inwardly to cooperate with the tapered shape of the cooking device. The brackets 42 connect to a bottom diffuser plate 44. One or more plates are mounted above the bottom diffuser plate 44. FIG. 7 illustrates three diffuser plates including the bottom diffuser plate 44, a middle diffuser plate 46, and a top diffuser plate 48. The middle diffuser plate 46 and the top diffuser plate 48 may rotate relative to the bottom diffuser plate and relative to each other. A bearing element 50 supports the diffuser plates mounted on top of the bottom diffuser plate 44 and provides space between the diffuser plates such that the diffuser plates do not interfere with each other in an undesirable manner. The diffuser plates are flat sheets of metal or similar materials able to withstand significant heat and are formed with openings. A purpose of the diffuser plate is to limit the amount of direct exposure between the heat source within the cooking device and the food element.

Figure 8:
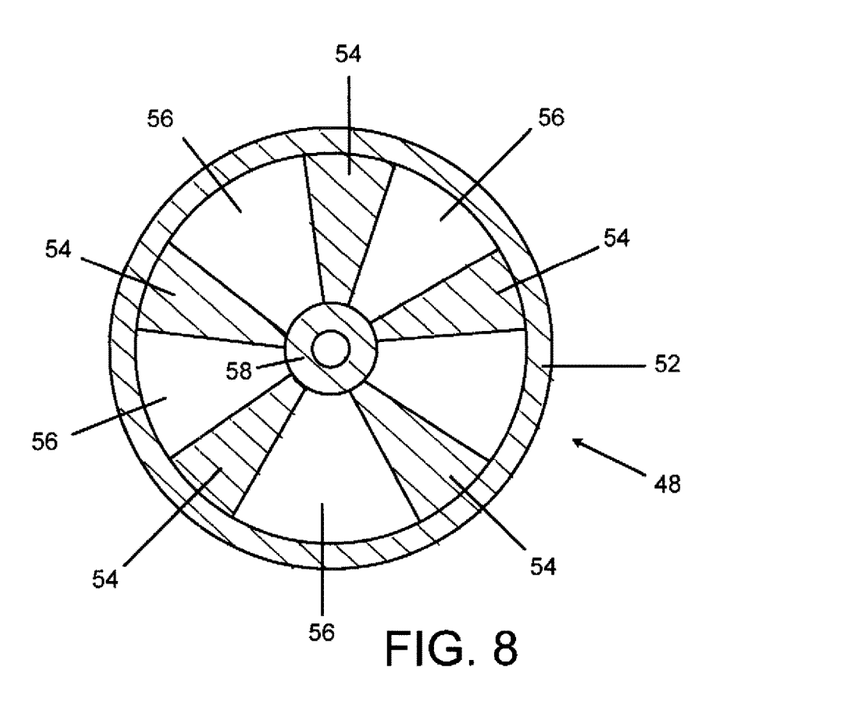
FIG. 8 is at top view of one possible embodiment of a diffuser plate of FIG. 7, in accordance with a first exemplary embodiment of the present disclosure.
Figure 9:
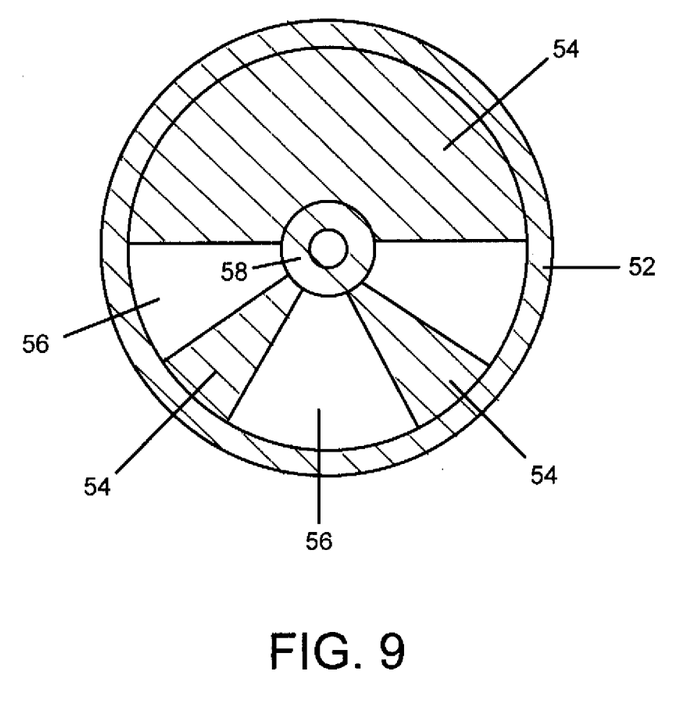
FIG. 9 is at top view of one possible embodiment of a diffuser plate of FIG. 7, in accordance with a first exemplary embodiment of the present disclosure.

FIG. 8 is at top view of one possible embodiment of a diffuser plate 48 of FIG. 7, in accordance with a first exemplary embodiment of the present disclosure. FIG. 9 is at top view of one possible embodiment of a diffuser plate 48 of FIG. 7, in accordance with a first exemplary embodiment of the present disclosure. For exemplary purposes, FIG. 8 and FIG. 9 illustrate two of the many possible designs of the diffuser plates. FIG. 8 illustrates a diffuser plate 48 including a solid rim 52, solid sheet elements 54 and openings 56. One having ordinary skill in the art will recognize that a series of diffuser plates 48 as illustrated in FIG. 8 could be rotated to deflect most or all of the direct heat from the heat source, or could be rotated to align the openings 56 to allow most of the direct heat access to the food element. The diffuser plate 48 also includes a hub 58 for connection to the bearing element 50 (not shown). FIG. 9 illustrates a diffuser plate 48 including a solid rim 52, solid sheet elements 54 and openings 56. One having ordinary skill in the art will recognize that a pair of diffuser plates 48 as illustrated in FIG. 8 could be rotated to deflect most or all of the direct heat from the heat source, or could be rotated to align the openings 56 to allow some of the direct heat access to the food element. Those having ordinary skill in the art will recognize various other shapes and patterns of the diffuser plates may be adopted to achieve direct heat control.

The diffuser system 40 may be used with cooking devices, namely outdoor grills and smokers with cylindrical designs. For example, the diffuser system 40 may be used with cylindrical or egg-shaped grills and smokers, known in the art as Kamado grills, which use a cylindrical base and a dome-shaped cover. The diffuser system 40 may provide many benefits to a user of the cooking device, including the benefits of being able to conveniently switch between direct and indirect heat and fitting a plurality of differently-sized cooking devices, among others.

The diffuser plates 44, 46, 48 may have a variety of sizes, diameters, and thicknesses, and be constructed from metals, such as commercial food grade metals. For example, the diffuser plates 44, 46, 48 may be constructed from commercial food grade 304 stainless steel and have a thickness of 14 gauge, ensuring that they're highly durable and provide years of use. The diffuser plates 44, 46, 48 may be positioned parallel to one another such that rotational movement of either of the diffuser plates 44, 46, 48 does not result in contact between diffuser plates 44, 46, 48. The bearing element 50 may include a spacer 51, which may be constructed from any number of durable, heat-resistant materials. The spacer 51 may be positioned around the bearing device 50, to which the diffuser plates 44, 46, 48 are connected. The diffuser plates 44, 46, 48 may include a catch to control the rotation of the upper diffuser plates 46, 48. The catch may stop rotation in one direction where minimum direct heat exposure is achieved and an opposite direction where maximum heat exposure is achieved. The rims 52 of the diffuser plates 44, 46, 48 may not contact the inside of the cooking element, thereby allowing heat to pass from the heat source around the diffuser plates 44, 46, 48 when the diffuser plates 44, 46, 48 are rotated into a substantially closed position.

Figure 10:
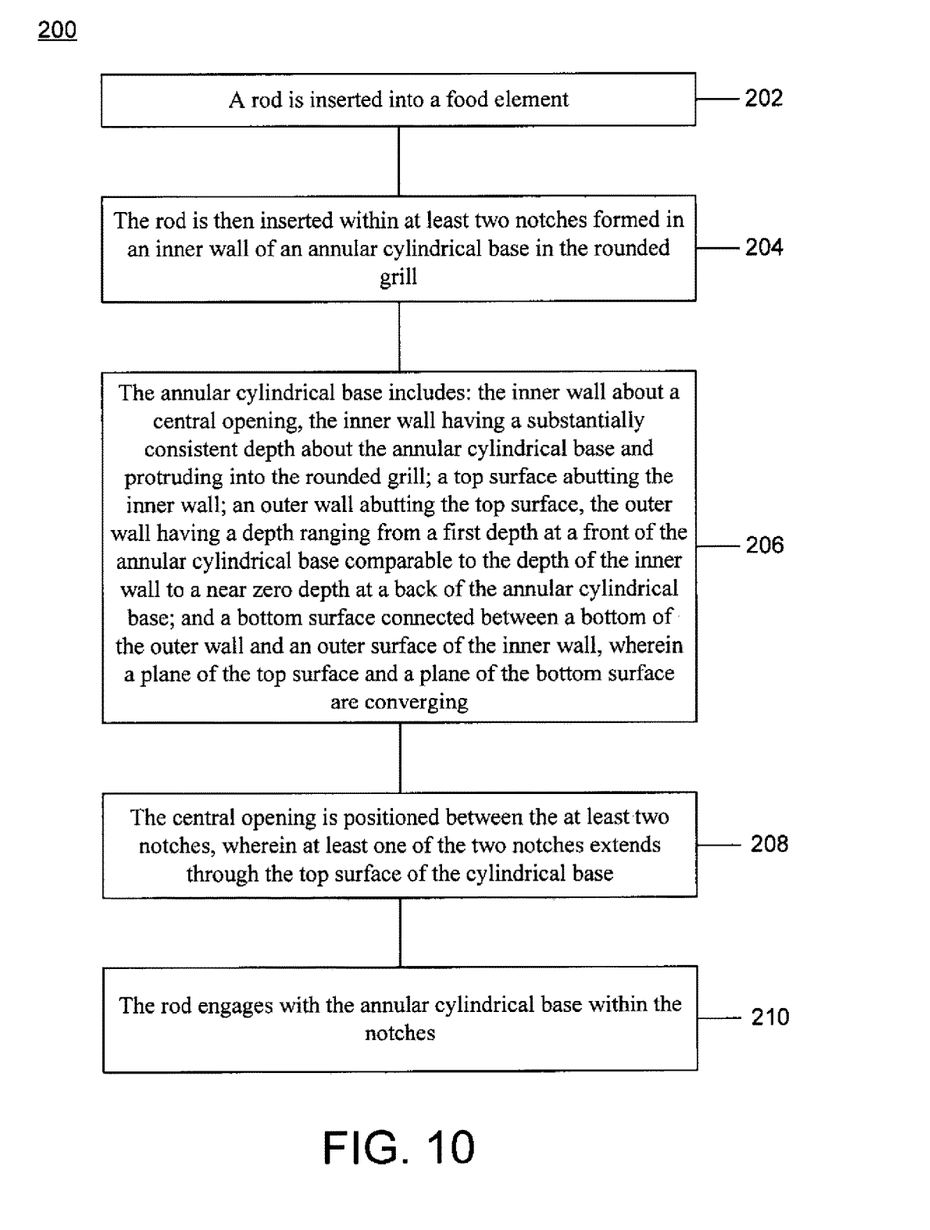
FIG. 10 is a flowchart illustrating a method of cooking within an egg-shaped grill using the rotisserie adapter apparatus of FIG. 1, in accordance with the first exemplary embodiment of the disclosure.

FIG. 10 is a flowchart 200 illustrating a method of cooking within a rounded grill using the rotisserie adapter apparatus 10 of FIG. 1, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, a rod is inserted into a food element. The rod is then inserted within at least two notches formed in an inner wall of an annular cylindrical base in the rounded grill (block 204). The annular cylindrical base includes: the inner wall about a central opening, the inner wall having a substantially consistent depth about the annular cylindrical base and protruding into the rounded grill; a top surface abutting the inner wall; an outer wall abutting the top surface, the outer wall having a depth ranging from a first depth at a front of the annular cylindrical base comparable to the depth of the inner wall to a near zero depth at a back of the annular cylindrical base; and a bottom surface connected between a bottom of the outer wall and an outer surface of the inner wall, wherein a plane of the top surface and a plane of the bottom surface are converging (block 206). The central opening is positioned between the at least two notches, wherein at least one of the two notches extends through the top surface of the cylindrical base (block 208). The rod engages with the annular cylindrical base within the notches (block 210).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:
1. A rotisserie adapter apparatus for use with a cooking device, the rotisserie adapter apparatus comprising:
   an annular cylindrical base comprising:
      an inner wall about a central opening, the inner wall having a substantially consistent depth about the annular cylindrical base;

a top surface of the annular cylindrical base abutting the inner wall;

an outer wall abutting the top surface, the outer wall having a depth ranging from a first depth at a front of the annular cylindrical base comparable to the depth of the inner wall to a near zero depth at a back of the annular cylindrical base; and a bottom surface of the annular cylindrical base connected between a bottom of the outer wall and an outer surface of the inner wall, wherein a plane of the top surface and a plane of the bottom surface are converging;

at least two notches formed in the inner wall, wherein the central opening is positioned between the at least two notches, and wherein at least one of the two notches extends through the top surface of the annular cylindrical base;

a plurality of protrusions extending inwardly from the inner wall;

a device supported by the protrusions; wherein the device supported by the protrusions further comprises a diffuser system hung beneath the rod, the diffuser further comprising:

a first substantially planar diffuser plate having a plurality of openings therein;

a second substantially planar diffuser plate having a plurality of openings therein, wherein the second diffuser plate is positioned parallel to the first diffuser plate;

a bearing device connected to both the first and second diffuser plates at a middle portion of each of the first and second diffuser plates, wherein the first and second diffuser plates are independently rotatable about the bearing device; and a spacer positioned between the first and second diffuser plates.

2. The apparatus of claim 1, further comprising a rod longer than an outer diameter of the annular cylindrical base, the rod positioned within two of the notches; and a motor connected to the rod for rotating the rod within the notches.

3. The apparatus of claim 2, wherein the annular cylindrical base further comprises an outer surface and further comprises a support extending from the outer wall and engaged with the motor thereby supporting weight of the motor.

4. The apparatus of claim 1, wherein the device supported by the protrusions further comprises a metal basket positioned abutting the inner wall.

5. The apparatus of claim 4, further comprising burning charcoal contained within the metal basket.

6. The apparatus of claim 1, further comprising a third substantially planar diffuser plate having an open half and a closed half, wherein the third diffuser plate is positioned parallel to the first and second diffuser plates.

7. A cooking apparatus, comprising:
an annular cylindrical base comprising:
an inner wall about a central opening;
a top surface abutting the inner wall; and
a plurality of protrusions extending inwardly from the inner wall; and
a diffuser system engaged to the plurality of protrusions, the diffuser system comprising:
a first substantially planar diffuser plate having a plurality of openings therein;
a second substantially planar diffuser plate having a plurality of openings therein, wherein the second diffuser plate is positioned parallel to the first diffuser plate;
a bearing device connected to both the first and second diffuser plates at a middle portion of each of the first and second diffuser plates, wherein the first and second diffuser plates are independently rotatable about the bearing device; and
a spacer positioned between the first and second diffuser plates.

8. The cooking apparatus of claim 7, further comprising a third substantially planar diffuser plate having an open half and a closed half, wherein the third diffuser plate is positioned parallel to the first and second diffuser plates.

* * * * *